US005723397A

United States Patent [19]

Verduijn

[11] Patent Number: 5,723,397
[45] Date of Patent: Mar. 3, 1998

[54] MOLECULAR SIEVE LAYERS AND PROCESSES FOR THEIR MANUFACTURE

[75] Inventor: Johannes Petrus Verduijn, Bertem, Belgium

[73] Assignee: Exxon Chemical Patents Inc., Houston, Tex.

[21] Appl. No.: 535,169

[22] PCT Filed: Apr. 25, 1994

[86] PCT No.: PCT/GB94/00878

§ 371 Date: Feb. 12, 1996

§ 102(e) Date: Feb. 12, 1996

[87] PCT Pub. No.: WO94/25152

PCT Pub. Date: Nov. 10, 1994

[30]  Foreign Application Priority Data

Apr. 23, 1993 [EP] European Pat. Off. ............... 93303187

[51] Int. Cl.$^6$ .................................................. B01J 20/28
[52] U.S. Cl. ................... 502/4; 502/64; 502/71; 502/77
[58] Field of Search ................................ 502/4, 64, 71, 502/77

[56]  References Cited

U.S. PATENT DOCUMENTS

| 5,019,263 | 5/1991 | Haag et al. | 502/60 |
| 5,258,339 | 11/1993 | Ma et al. | 502/4 |
| 5,266,542 | 11/1993 | Hashimoto et al. | 502/64 |

FOREIGN PATENT DOCUMENTS

| 135069 | 3/1985 | European Pat. Off. . |
| 149343 | 7/1985 | European Pat. Off. . |
| 397216 | 11/1990 | European Pat. Off. . |
| 481660 | 4/1992 | European Pat. Off. . |

OTHER PUBLICATIONS

Journal of Membrane Science, Vol. 73, 1992, pp. 111–128 (no month).

*Primary Examiner*—Michael Lewis
*Assistant Examiner*—Thomas G. Dunn, Jr.
*Attorney, Agent, or Firm*—Edward F. Sherer

[57]  ABSTRACT

Molecular sieve layers on a support are deposited from a synthesis solution while increasing the solution temperature.

19 Claims, No Drawings

MOLECULAR SIEVE LAYERS AND PROCESSES FOR THEIR MANUFACTURE

This invention relates to molecular sieves, more especially to crystalline molecular sieves, and to layers containing them. More especially, the invention relates to a layer, especially a supported layer, containing particles of a crystalline molecular sieve, and a process for its manufacture.

Molecular sieves find many uses in physical, physicochemical, and chemical processes, most notably as selective sorbents, effecting separation of components in mixtures, and as catalysts. In these applications, the crystallographically-defined pore structure within the molecular sieve material is normally required to be open, and it is then a prerequisite that any structure-directing agent, or template, that has been employed in the manufacture of the molecular sieve be removed, usually by calcination.

Numerous materials are known to act as molecular sieves, among which zeolites form a well-known class. Examples of zeolites and other materials suitable for use in the invention will be given below.

When molecular sieves are used as sorbents or catalysts they are often in granular form. Such granules may be composed entirely of the molecular sieve or be a composite of a binder or support and the molecular sieve, with the latter distributed throughout the entire volume of the granule. In any event, the granule usually contains a non-molecular sieve pore structure which improves mass transfer through the granule.

The support may be continuous, e.g., in the form of a plate, or it may be discontinuous, e.g., in the form of granules. The molecular sieve crystals may be of such a size that, although the pores of the support are occupied by the crystals, the pores remain open. Alternatively, the molecular sieve may occupy the pores to an extent that the pores are effectively closed; in this case, when the support is continuous a molecular sieve membrane may result.

Thus, depending on the arrangement chosen and the nature and size of the material to be contacted by the molecular sieve, material may pass through the bulk of the molecular sieve material entirely through the pores of the molecular sieve material, or entirely through interstices between individual particles of the molecular sieve material, or partly through the pores and partly through the interstices.

Molecular sieve layers having the permeation path entirely through the molecular sieve crystals have been proposed for a variety of size and shape selective separations. Membranes containing molecular sieve crystals have also been proposed as catalysts having the advantage that they may perform catalysis and separation simultaneously if desired.

In our earlier European Patent Application No. 93.303 187.4, and a corresponding PCT Application No. PCT/E94/01301 filed simultaneously with this application, the disclosures of which are incorporated herein by reference, there are described a supported inorganic molecular sieve layer having a controllable thickness that may, if desired, be of a thickness of the order of only a few microns, and processes for its manufacture.

Such a layer and a process for its manufacture make possible the production of a number of useful products, including membranes, which because of their uniformity and thinness will have predictable properties, and will permit a high flux.

One process according to our earlier application comprises preparing a synthesis mixture comprising a source of silica and an organic structure directing agent in the form of a hydroxide in a proportion sufficient to effect substantially complete dissolution of the silica source in the mixture at the boiling temperature of the mixture, immersing the support in the synthesis mixture, crystallizing zeolite from the synthesis mixture onto the support, and if desired or required calcining the crystallized layer.

This process gives a uniform layer which is of sufficient thickness for many purposes. For other purposes, however, a layer of greater thickness is desirable.

The present invention provides a process for the manufacture of a layer comprising a crystalline molecular sieve on a porous support, which comprises preparing a synthesis mixture comprising a source of silica and an organic structure directing agent, immersing the support in the synthesis mixture and crystallizing zeolite from the synthesis mixture onto the support, the temperature of the synthesis mixture being increased during crystallization.

The synthesis mixture will also contain a source of other components, if any, in the zeolite.

Subsequently to crystallization, if desired or required the supported layer may be calcined.

Advantageously, the source of silica is in solution in the synthesis mixture, and dissolution may be facilitated by employing the structure directing agent in a proportion sufficient to effect substantially complete dissolution of the source at the boiling temperature of the mixture.

The synthesis mixture is advantageously prepared as described in International Application WO93/08125, the disclosure of which is incorporated herein by reference.

The increase in temperature may be continuous but is advantageously stepwise. Advantageously, the temperature is increased within the range of from 70° C. to 170° C., and preferably from 90° C. to 150° C., over the crystallization period. Advantageously, the temperature at the end of the crystallization period is at least 120° C. That period may, for example, range from 24 hours to 7 days, and is preferably between 3 and 6 days. Advantageously, the temperature is increased at least once after deposition of crystals on the support has commenced. Preferably the temperature is increased at least twice after deposition has commenced.

Conveniently, the temperature is increased in steps after a time long enough to bring about deposition, and advantageously substantial deposition, at the lower temperature.

Preferably, the synthesis mixture is maintained at each temperature stage until deposition, as measured by weight increase, has ceased at that temperature. This time tends to decrease with increase in temperature but may be, for example, from 4 to 48 hours, advantageously for from 8 to 24 hours. The increase in temperature at each step may conveniently be at least 20° C.

The process has advantages over other methods of obtaining thicker layers which require washing of the support after initial or any previous deposition and replacement of the synthesis mixture.

Advantageously, the mean particle size of the crystalline molecular sieve in the layer is within the range of from 20 to 500 nm, preferably it is within the range of from 20 to 300 nm and most preferably within the range of from 20 to 200 nm. Alternatively, the mean particle size is advantageously such that at least 5% of the unit cells of the crystal are at the crystal surface.

Advantageously, the particle size distribution is such that 95% of the particles have a size within ±33% of the mean, preferably 95% are within ±10% of the mean and most preferably 95% are within ±7.5% of the mean.

The invention also provides a supported layer made by the process of the invention. The layer comprises molecular sieve particles; these are identifiable as individual particles (although they may be intergrown as indicated below) by electron microscopy. The layer, at least after calcining, is mechanically cohesive and rigid. Within the interstices between the particles in this rigid layer, there may exist non-molecular sieve pores, which may be open, or partially open, to permit passage of material through or within the layer, or may be completely sealed, permitting passage through the layer only through the pores in the particles.

It will be understood that the particle size of the molecular sieve material forming the layer may vary continuously or stepwise with distance from the support. In such a case, the layer is considered to be uniform if the particle size distribution is within the defined limit at one given distance from the support, although advantageously the particle size distribution will be within the defined limit at each given distance from the support.

The use of molecular sieve crystals of small particle size and preferably of homogeneous size distribution facilitates the manufacture of a three-dimensional structure which may if desired be thin but which is still of controlled thickness.

Advantageously, the particles are contiguous, i.e., substantially every particle is in contact with one or more of its neighbours, although not necessarily in contact with all its closest neighbours. Such contact may be such in some embodiments that neighbouring crystal particles are intergrown, provided they retain their identity as individual crystalline particles. Advantageously, the resulting three dimensional structure is grain-supported, rather than matrix-supported, if the layer does not consist essentially of the crystalline molecular sieve particles. In a preferred embodiment, the particles in the layer are closely packed.

It will be understood that references herein to the support of a layer include both continuous and discontinuous supports.

References to particle size are to the longest dimension of the particle and particle sizes are as measured by direct imaging with electron microscopy. Particle size distribution may be determined by inspection of scanning electron micrograph images, and analysing an appropriately sized population of particles for particle size.

As molecular sieve, there may be mentioned a silicate, an aluminosilicate, an aluminophosphate, a silicoaluminophosphate, a metalloaluminophosphate, or a metalloaluminophosphosilicate.

The preferred molecular sieve will depend on the chosen application, for example, separation, catalytic applications, and combined reaction separation. There are many known ways to tailor the properties of the molecular sieves, for example, structure type, chemical composition, ion-exchange, and activation procedures.

Representative examples are molecular sieves/zeolites of the structure types AFI, AEL, BEA, CHA, EUO, FAU, FER, KFI, LTA, LTL, MAZ, MOR, MFI, MEL, MTW, OFF, TON and faujasite. The process of the invention is especially suited to the manufacture of supported layers of MFI, MEL, and faujasite structures.

Some of the above materials while not being true zeolites are frequently referred to in the literature as such, and this term is used broadly in this specification.

Advantageously, the silica is advantageously introduced into the synthesis mixture in particulate form e.g., as silicic acid powder.

The organic structure directing agent is advantageously introduced into the synthesis mixture in the form of a base, specifically in the form of a hydroxide, but a salt, e.g. a halide, especially a bromide, may be employed.

The structure directing agent may be, for example, the hydroxide or salt of tetramethylammonium (TMA), tetraethylammonium (TEA), triethylmethylammonium (TEMA), tetrapropylammonium (TPA), tetrabutylammonium (TBA), tetrabutylphosphonium (TBP), trimethylbenzylammonium (TMBA), trimethylcetylammonium (TMCA), trimethylneopentylammonium (TMNA), triphenylbenzylphosphonium (TPBP), bispyrrolidinium (BP), ethylpyridinium (EP), diethylpiperidinium (DEPP) or a substituted azoniabicyclooctane, e.g. methyl or ethyl substituted quinuclidine or 1,4-diazoniabicyclo-(2,2,2)octane.

Preferred structure directing agents are the hydroxides of TMA, TEA, TPA and TBA.

The thickness of the molecular sieve layer is advantageously within the range of 0.1 to 15 µm, preferably from 0.1 to 2 µm. Advantageously, the thickness of the layer and the particle size of the molecular sieve are such that the layer thickness is at least twice the particle size, resulting in a layer several particles thick rather than a monolayer of particles.

Advantageously, the layer is substantially free of pinholes, i.e., substantially free from apertures of greatest dimension greater than 0.1 µm. Advantageously, at most 0.1% and preferably at most 0.0001% of the surface area is occupied by such apertures.

Depending on the intended end use of the layer, a greater or smaller proportion of the area of the layer may be occupied by macropores, apertures having a greatest dimension less than 0.1 µm but greater than 1 nm. These macropores may be formed by the interstices between the crystals of the molecular sieve, if the layer consists essentially of the molecular sieve, and elsewhere, if the layer comprises the molecular sieve and other components. Such layers may be used, inter alia, for ultrafiltration, catalytic conversion, and separations based on differences in molecular mass (Knudsen diffusion), and indeed for any processes in which a high surface area is important.

The layer advantageously has a large proportion of its area occupied by crystalline-bounded micropores, i.e., pores of a size between 0.2 and 1 nm, depending on the particular molecular sieve being employed. Pores of size within the micropore range result, for example, when the layer contains a component in addition to one derived from colloidal molecular sieve particles. In another embodiment especially suitable for ultrafiltration, the layer contains nanopores, i.e., pores of a size between 1 and 10 nm.

The layer support may be either non-porous or, preferably, porous, and may be continuous or particulate. As examples of non-porous supports there may be mentioned glass, fused quartz, and silica, silicon, dense ceramic, for example, clay, and metals. As examples of porous supports, there may be mentioned porous glass, sintered porous metals, e.g., steel or nickel (which have pore sizes typically within the range of 0.2 to 15 µm), and, especially, an inorganic oxide, e.g., alpha-alumina, titania, an alumina/zirconia mixture, or Cordierite.

At the surface in contact with the layer, the support may have pores of dimensions up to 50 times the layer thickness, but preferably the pore dimensions are comparable to the layer thickness.

Advantageously, the support is porous alpha-alumina with a surface pore size within the range of from 0.08 to 10 µm, preferably from 0.08 to 1 µm, most preferably from 0.08 to 0.16 µm, and advantageously with a narrow pore size distribution. The support may be multilayered; for example, to improve the mass transfer characteristics of the layer, only the surface region of the support in contact with the layer may have small diameter pores, while the bulk of the support, toward the surface remote from the layer, may have large diameter pores. An example of such a multilayer support is an alpha-alumina disk having pores of about 1 μm diameter coated with a layer of alpha-alumina with pore size about 0.08 μm.

The invention also provides a structure in which the support, especially a continuous porous support, has a molecular sieve layer on each side of the support, the layers on the two sides being the same or different.

The layer may, and for many uses advantageously does, consist essentially of the molecular sieve material, or it may be a composite of the molecular sieve material and intercalating material which is also advantageously inorganic. The intercalating material may be the material of the support. If the layer is a composite it may, as indicated above, contain macropores and/or micropores, bounded by molecular sieve portions, by portions of intercalating material, or by both molecular sieve and intercalating material. The material may be applied to the support simultaneously with or after deposition of the molecular sieve, and may be applied, for example, by a sol-gel process followed by thermal curing. Suitable materials include, for example, inorganic oxides, e.g., silica, alumina, and titania.

The intercalating material is advantageously present in sufficiently low a proportion of the total material of the layer that the molecular sieve crystals remain contiguous.

The layer produced in accordance with the processes of the invention may be treated in manners known per se to adjust their properties, e.g., by steaming or ion exchange to introduce different cations or anions, by chemical modification, e.g., deposition of organic compounds into the pores of the molecular sieve, or by introduction of a metal.

The layer may be used in the form of a membrane, used herein to describe a barrier having separation properties, for separation of fluid (gaseous, liquid, or mixed) mixtures, for example, separation of a feed for a reaction from a feedstock mixture, or in catalytic applications, which may if desired combine catalysed conversion of a reactant or reactants and separation of reaction products.

Separations which may be carried out using a membrane comprising a layer in accordance with the invention include, for example, separation of normal alkanes from co-boiling hydrocarbons, especially n-$C_{10}$ to $C_{16}$ alkanes from kerosene; separation of aromatic compounds from one another, especially separation of $C_8$ aromatic isomers from each other, more especially para-xylene from a mixture of xylenes and, optionally, ethylbenzene, and separation of aromatics of different carbon numbers, for example, mixtures of benzene, toluene, and mixed $C_8$ aromatics; separation of aromatic compounds from aliphatic compounds, especially aromatic molecules with from 6 to 8 carbon atoms from $C_5$ to $C_{10}$ (naphtha range) aliphatics; separation of olefinic compounds from saturated compounds, especially light alkenes from alkane/alkene mixtures, more especially ethene from ethane and propene from propane; removing hydrogen from hydrogen-containing streams, especially from light refinery and petrochemical gas streams, more especially from $C_2$ and lighter components; and alcohols from aqueous streams.

The supported layer of the invention may be employed as a membrane in such separations without the problem of being damaged by contact with the materials to be separated. Furthermore, many of these separations are carried out at elevated temperatures, as high as 500° C., and it is an advantage of the supported layer of the present invention that it may be used at such elevated temperatures.

The present invention accordingly also provides a process for the separation of a fluid mixture which comprises contacting the mixture with one face of a layer according to the invention in the form of a membrane under conditions such that at least one component of the mixture has a different steady state permeability through the layer from that of another component and recovering a component or mixture of components from the other face of the layer.

The invention further provides a process for catalysing a chemical reaction which comprises contacting a feedstock with a layer according to the invention which is in active catalytic form under catalytic conversion conditions and recovering a composition comprising at least one conversion product.

The invention further provides a process for catalysing a chemical reaction which comprises contacting a feedstock with one face of a layer according to the invention, that is in the form of a membrane and in active catalytic form, under catalytic conversion conditions, and recovering from an opposite face of the layer at least one conversion product, advantageously in a concentration differing from its equilibrium concentration in the reaction mixture.

The following examples illustrate the invention:

Example 1

A porous alpha-alumina disk with a pore diameter of 160 nm, polished on one side, was cut into four equal-sized parts. The parts were weighed and placed, polished side up, on ptfe rings resting on the bottom of a stainless steel autoclave. In the autoclave was poured 70.22 g of a synthesis solution with a molar composition of

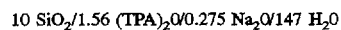

10 $SiO_2$/1.56 $(TPA)_2O$/0.275 $Na_2O$/147 $H_2O$

The open autoclave was placed in an exsiccator, which was then evacuated over 0.5 hours to increase the penetration of synthesis solution into the disk pieces. The autoclave was taken out of the exsiccator, closed, and placed in an oven at room temperature. The oven was heated up to 90° C. over a few minutes and kept at that temperature for 48 hours. The autoclave was then cooled to room temperature, opened and one of the support pieces was removed. The autoclave was closed again and placed in an oven at room temperature. The oven was heated up to 110° C. over a few minutes and kept at that temperature for 24 hours. The autoclave was cooled down again and a second piece was removed. The temperature cycle was repeated twice, first for 24 hours at 130° C. and then for 24 hours at 150° C. The four pieces of the disk were all washed with demineralized water at 70° C. until the washing water had a conductivity of about 6 micro Siemens/cm, dried at 105° C. and cooled to room temperature in an exsiccator. It was observed that with each ageing step the weight of the disk pieces increased, as shown in the following table:

| Disk Piece # | Temperature History,°C. | Weight Increase,% |
|---|---|---|
| 1 | 90 | 0.88 |
| 2 | 90; 110 | 2.04 |
| 3 | 90; 110; 130 | 3.50 |
| 4 | 90; 110; 130; 150 | 5.63 |

X-ray diffraction showed that with each ageing step the intensity of the zeolite peaks increased with respect to the intensity of the alpha-alumina peaks, as shown in the following table:

| disk piece | peak intensity ratio: peak at d = 0.385 nm (MFI)/ peak at d = 0.348 nm (Al2O3) |
| --- | --- |
| 1 | 0.190 |
| 2 | 0.217 |
| 3 | 0.236 |
| 4 | 0.332 |

These results indicate that with each ageing step at a higher temperature new zeolite crystals are deposited on the support.

Example 2

In a similar experiment, the procedure of Example 1 was repeated, but without cooling the autoclave to remove disk pieces. A disk similar to that of Disk No. 4 of Example 1 resulted, with a weight increase of 5.38%.

I claim:
1. A process for the manufacture of a layer comprising a crystalline molecular sieve on a support comprising:
   a) preparing a synthesis mixture comprising a source of silica and an organic structure-directing agent;
   b) immersing said support in said synthesis mixture;
   c) heating said synthesis mixture containing said immersed support to an initial temperature of at least 70° C. and maintaining said synthesis mixture at said initial temperature for a period of crystallization time sufficient to deposit zeolite crystals onto said support; and
   d) further heating said synthesis mixture containing said immersed support to a second temperature higher than said initial temperature for a period of crystallization time sufficient to deposit additional zeolite crystals onto said support and to form said layer.

2. The process of claim 1 wherein said crystals in said layer have a particle size in the range of from 20 to 500 nm.

3. The process of claim 1 wherein said crystals in said layer have a particle size of in the range of from 20 to 300 nm.

4. The process of claim 1 wherein said layer contains nanopores having a dimension of 1 to 10 nm.

5. The process of claim 1 wherein said layer contains micropores having a dimension of 0.2 to 1 nm.

6. The process of claim 1 wherein said synthesis mixture is maintained at said initial temperature until deposition of zeolite crystals at said temperature has ceased.

7. The process of claim 1 which is a stepwise process and wherein said synthesis mixture is maintained at said second temperature for a period of crystallization time sufficient to deposit additional zeolite crystals onto said support.

8. The process of claim 7 wherein said synthesis mixture containing said immersed support is further stepwise heated to at least one additional temperature higher than said second temperature and wherein said synthesis mixture is maintained at said at least one additional temperature for a period of crystallization time sufficient to deposit additional zeolite crystals onto said support.

9. The process of claim 8 wherein the maximum additional heating temperature is up to 170° C.

10. The process of claim 8 wherein the maximum additional heating temperature ranges from 120° to 170° C.

11. The process of claim 1 wherein said synthesis mixture is heated in step (d) to a maximum temperature of up to 170° C.

12. The process of claim 1 wherein said synthesis mixture is heated in step (d) to a minimum temperature of at least 120° C.

13. The process of claim 1 wherein said support is porous.

14. The process of claim 13 wherein said layer has a thickness in the range of 0.1 to 15 μm.

15. A process as claimed in claim 1, wherein the crystallization period is from 24 hours to 7 days.

16. A process as claimed in claim 15, wherein the period is from 3 to 6 days.

17. A process as claimed in claim 1, wherein after its deposition on the support the supported zeolite layer is calcined.

18. A process for the manufacture of a layer comprising a crystalline molecular sieve on a porous support comprising:
   a) preparing a synthesis mixture comprising an aqueous solution of a source of silica and an organic structure-directing agent;
   b) immersing said support in said synthesis mixture;
   c) heating said synthesis mixture containing said immersed support in a first step to a first temperature of at least 70° C. and maintaining said synthesis mixture at said first temperature for a period of crystallization time sufficient to deposit zeolite crystals onto said support;
   d) further heating said synthesis mixture containing said immersed support from step (c) in a second step to a second temperature higher than said first temperature and maintaining said synthesis mixture at said second temperature for a period of crystallization time sufficient to deposit additional zeolite crystals onto said support; and
   e) further heating said synthesis mixture containing said immersed support from step (d) in at least one additional step to at least one additional temperature higher than said second temperature and maintaining said synthesis mixture at each of said additional temperatures for a period of crystallization time sufficient to deposit additional zeolite crystals onto said support and to form said layer, the maximum temperature to which said synthesis mixture is heated ranging from 120° to 170° C.

19. The process of claim 18 wherein the temperature increase in each heating step is at least 20° C.

* * * * *